United States Patent [19]

Cosway

[11] 4,317,901

[45] Mar. 2, 1982

[54] METHOD FOR THE PRODUCTION OF A POWDERED PHENOLIC RESOLE RESIN

[75] Inventor: Harry F. Cosway, Cincinnati, Ohio

[73] Assignee: Formica Corporation, Wayne, N.J.

[21] Appl. No.: 194,486

[22] Filed: Oct. 6, 1980

[51] Int. Cl.$^3$ .............................................. C08G 8/10
[52] U.S. Cl. .................................. 528/139; 528/137; 528/140; 528/145; 528/165; 528/485; 528/488; 528/489; 528/490
[58] Field of Search ............... 528/137, 139, 140, 145, 528/165, 485, 488, 489, 490

[56] References Cited

U.S. PATENT DOCUMENTS

| | | | |
|---|---|---|---|
| 1,150,642 | 8/1915 | Stockhausen | 528/139 X |
| 1,197,171 | 9/1916 | Aylsworth | 528/140 X |
| 1,697,885 | 1/1929 | Seebach | 528/489 X |
| 1,807,545 | 5/1931 | Ostersetzer | 528/137 X |
| 2,371,915 | 3/1933 | Rector et al. | 528/137 X |
| 2,424,787 | 7/1947 | Adams, Jr. | 528/140 X |
| 2,690,393 | 9/1954 | McGarvey | 528/140 X |
| 2,744,875 | 5/1956 | Thomas et al. | 528/140 X |
| 4,269,949 | 5/1981 | Hickson et al. | 528/140 X |
| 4,281,098 | 7/1981 | McCormick | 528/139 |

FOREIGN PATENT DOCUMENTS 1347878 2/1974 United Kingdom .

Primary Examiner—Howard E. Schain
Attorney, Agent, or Firm—Frank M. Van Riet

[57] ABSTRACT

A method for the production of a powdery, free-flowing phenol/formaldehyde resin is disclosed wherein a polyvalent cationic precipitant is added to the resin emulsion produced, the precipitate is filtered, washed with water and dried.

6 Claims, No Drawings

METHOD FOR THE PRODUCTION OF A POWDERED PHENOLIC RESOLE RESIN

PRIOR ART STATEMENT

The closest prior art of which the inventor is aware is British Patent 1,347,878 however, the fusibility agent disclosed therein has been found to be unnecessary. Additionally, reaction time has been lowered. Furthermore, the use of a polyvalent cationic precipitant in order to recover powdery, free-flowing product is not taught therein.

BACKGROUND OF THE INVENTION

The production of phenol/formaldehyde resins has been practiced for many years. These resins find many uses, not the least of which is in the production of decorative laminates wherein Kraft paper sheets are impregnated therewith and used, after drying, as the core of the laminate. For use as an impregnating resin, the phenolic resin is manufactured as a solution in water.

For many other uses, it is preferred that the resin be manufactured in the form of a solid, free-flowing powder. In this form, the resin is more economically shipped and, if desired, can be solubilized at the location of its use.

Solid, powdery, free-flowing resins of phenol and formaldehyde have been produced, however, their method of manufacture has been very cumbersome and expensive. Furthermore, most commercially available solid phenolic resins have a tendency to cake together and form large lumps or aggregates on storage for short periods of time. Since grinding these aggregates in order to reduce their particle size creates heat and heat is detrimental to the resin by causing further reaction and increased fusing of the resin particles together, it is extremely difficult to break the agglomerates down into their original particle size.

Therefore, if a process could be developed for the production of a phenolic resin which is powdery, free-flowing and free of the tendency to agglomerate upon storage, a long-felt need would be satisfied.

SUMMARY OF THE INVENTION

This invention comprises a method for the production of free-flowing, powdery phenolic resole resins which do not tend to agglomerate upon storage. The crux of the method is the use of a polyvalent cationic precipitant during the recovery stage of the condensation reaction of phenol and formaldehyde and water washing the resulting resin under controlled conditions. The lengthy, laborious, economically unattractive and pollution-prone methods previously used to recover solid phenolic resin products are avoided by this unique process.

DESCRIPTION OF THE INVENTION INCLUDING PREFERRED EMBODIMENTS

The instant invention comprises a method for the production of a powdery, free-flowing phenol/formaldehyde resin which comprises reacting formaldehyde with phenol in the presence of an aqueous solution of a surfactant and a protective colloid until a viscous resin emulsion is formed, adding a polyvalent, cationic precipitant to the resulting reaction mixture, filtering, washing the precipitate with water, drying and recovering the resultant dry resin.

According to the invention, the molar ratio of the formaldehyde to the phenol employed ranges from about 1.2 to 1 to about 1.6 to 1, preferably from about 1.4 to 1. The phenol and formaldehyde are condensed at a temperature ranging from about 30° C. to about 110° C., preferably from about 50° C. to about 85° C. Phenol, resorcinol, metacresol, paracresol and xylenol etc. may be used, however, phenol is preferred.

The thermosetting phenolic resin is produced in aqueous solution, in the presence of an organic or inorganic base as a catalyst. Suitable catalysts include ammonia, ethylenediamine, diethylenetriamine, hexamethylenediamine, hexamethylenetetramine and the like. Amounts ranging from about 0.02 to 0.5 mole per mole of phenol, preferably from about 0.05 to about 0.2 mole.

The phenolic resin is produced as beads by the use of a suitable surfactant and a protective colloid, the total amount of either colloid or surfactant colloid mixture used ranging from about 1 to about 25 parts per thousand, by weight, based on the total charge to the condensation reactor, including water. The surface-active agent is not essential to the success of the process, but is preferred. Examples of suitable surface active agents include alkaline alkylarylsulfonate while suitable protective colloids include carboxymethyl cellulose, polyethylene glycol, sodium alginate, the sodium salt of carboxymethyl cellulose and the like. The specific surface active agent employed, and the specific protective colloid employed, is not critical and any such materials known to those skilled in the art can be used. According to the invention, a phenol/formaldehyde resin, in the form of a suspension of oily droplets in the reaction medium results. The equilibrium thereof is stabilized by the surface active agent—protective colloid which prevents the coalescence of the droplets and the particle size of the resin droplets is controlled by the amount of the surface active agent—protective colloid used, the more used the smaller the droplets. The size of the particles of resin recovered usually ranges from about 0.05 to about 3.0 mm. When a surfactant-colloid mixture is employed, the mixture should contain at least 50%, by weight, of the protective colloid.

The ingredients of the reaction mixture are allowed to condense for from 1 to 4 hours, preferably 2–3 hours, and it is preferred that the surfactant and protective colloid be added with the original charge rather than after an initial reaction period of the phenol and formaldehyde. The final ingredient added is preferably the catalyst.

The crux of the process of the present invention is the recovery of the resin as solid particles. When the recovery steps hereof are followed, a resin product is quickly and easily isolated, the particle size of which is essentially equivalent to the size created during the condensation reaction. This result is accomplished by creating a filterable reaction mixture by the addition thereto of a polyvalent cationic precipitant. These polyvalent cationic precipitants form insoluble precipitates when added to the reaction media. Upon addition of the polyvalent cationic precipitant, the reaction media proceeds from a viscous suspension, to a grainy, muddy state and, after agitation, to a fluid, mobile condition which is filterable. In order to achieve effective recovery of the resin, the reaction media must go through this change sequence. The change sequence is dependent upon the amount of polyvalent cationic precipitant added. Although the amount of polyvalent cationic precipitant employed varies depending upon the specific material used, it is generally necessary to add at least about 0.5%, by weight, based on the weight of phenol charged to the reaction mixture, preferably from about 2.0% to about 10.0%, by weight, same basis.

Examples of polyvalent cationic precipitants found useful in the instant process are those containing metals of Groups IB, IIIA, IVB, IVA and VIB of Mendeleeff's periodic Table of the Elements, with water-soluble salts of the trivalent metals being preferred. Examples of materials suitable for this purpose include the water-soluble salts of aluminum, tin, lead, zirconium, chromium, copper, uranium, silver, etc. including, but not limited to, aluminum sulfate, aluminum chloride, soda alum, stannous chloride, lead nitrate, lead acetate, chromous chloride, chromic chloride, cupric chloride, cupric nitrate, cupric sulfate, silver nitrate, uranyl nitrate, uranyl acetate, zirconyl chloride, zirconyl nitrate and the like.

Aluminum sulfate is the preferred polyvalent cationic precipitant, industrial grade alum being equivalent thereto.

After the polyvalent cationic precipitant is added to the reaction mixture and has gone through the condition sequence described above, with agitation, the precipitate is then filtered off and washed with water. The washing step is also critical in order to obtain a friable, dry resin product of optimum particle size.

The washing step must be conducted using at least about 10 parts of water per part of dry solids in the filter cake preferably at least about 15 parts. The use of too much water in the washing step is not serious, however, the use of too little water will result in the formation of a very hard, discolored product which appears to be agglomerates which are fused together. The agglomerates are extremely difficult, if not impossible, to break down into their original particle size because the heat created by grinding is detrimental to the resin in that it causes further reaction and increasing particle fusion.

The resultant washed filter cake is then preferably dried, although drying is not critical. When drying is employed, room temperature drying in air is preferred because generally such conditions do not cause agglomeration of the resin particles.

Upon recovery, there is obtained a resin product whose particle size is essentially equivalent to the particle size created during the condensation reaction, the final product size thereby being controlled by the surfactant-protective colloid concentration employed, a very desirable method of particle size control.

The following examples are set forth for purposes of illustration only and are not to be construed as limitations on the present invention except as set forth in the appended claims. All parts and percentages are by weight unless otherwise specified.

EXAMPLE 1

To a suitable reaction vessel are charged sequentially 940 parts of phenol, 1154 parts of 37% formaldehyde and 198 parts of water. To 10 parts of the sodium salt of carboxymethyl cellulose are added 40 parts of methanol in order to prewet the cellulose powder. The prewetted cellulose and 1.13 parts of a commercially available surfactant are then added to 800 parts of water and the resultant solution is then charged to the reaction vessel. The temperature of the batch is raised to 40°–50° C. and 120 parts of 28% aqueous ammonia catalyst are then added. Upon addition of the ammonia, the temperature rises 10° C. and is then heated to 80° C. and held at that temperature for 2 hours.

An aqueous phase and an organic phase form at about 78° C. and after the 2 hour reaction time is complete, the batch is cooled to 40° C. and discharged.

The resultant reaction mixture is an essentially stable emulsion having a Brookfeed viscosity of approximately 5000 cp. at room temperature. The reaction mixture is divided into two equal portions, the first of which is allowed to settle slowly upon standing for several days. Filtration of the settled resin is impossible due to the immediate "blinding" of the filter paper due to the small size of the resin particles.

To the second portion of the reaction mixture are added 9.4 parts of industrial grade alum. The resultant mass is agitated and passes from the viscous emulsion, through a very dry, grainy stage and finally to a very mobile, fluid stage.

The mobile, fluid material is filtered and the resultant filter cake is washed with 8000 parts of water. After washing, the cake is dried at room temperature in air for 16 hours. A finely divided resin powder is recovered which, after 1 year remains free-flowing and granular.

EXAMPLE 2

The procedure of Example 1 is again followed except that stannous chloride is used in place of the alum used therein. Substantially equivalent results are achieved except that the precipitate is slower filtering.

EXAMPLE 3

Again following the procedure of Example 1 except that the alum is replaced by chromic chloride, a light gray-green precipitate results which is easily filterable and is recovered as free-flowing particles.

EXAMPLE 4

When the procedure of Example 1 is again followed except that lead acetate is used in place of the alum, similar results are observed.

EXAMPLE 5

The replacement of the alum of Example 1 by cupric chloride results in the recovery of free-flowing, non-agglomerating resin particles from a bright green precipitate.

EXAMPLES 6–8 (COMPARATIVE)

Using (6) strontium chloride, (7) barium chloride or (8) ferrous sulfate in place of the alum of Example 1 results in a "salting out" effect, but no precipitate is formed. No useful product is recovered.

I claim:
1. A method for the production of a powdery, free-flowing phenol/formaldehyde condensation product which comprises:
   (a) reacting formaldehyde with phenol in a molar ratio of from about 1.2 to 1 to about 1.6 to 1 respectively, in the presence of an aqueous solution of a catalyst, a surfactant and a protective colloid until a viscous, resin emulsion is formed.
   (b) adding to the viscous, resin emulsion with agitation, sufficient polyvalent, catonic precipitant to cause the emulsion to pass through a muddy, grainy state to a fluid, mobile condition;
   (c) fltering the resultant media,
   (d) washing the resultant filter cake with at least 15 parts of water per part of dry solids therein and

(e) recovering the resultant phenol/formaldehyde condensation product.

2. A method according to claim 1 wherein the water-washed filter cake is dried in air at room temperature before recovery.

3. A method according to claim 1 wherein said polyvalent cationic precipitant is aluminum sulfate.

4. A method according to claim 1 wherein said (a) is conducted at a temperature ranging from about 30° C. to about 110° C.

5. A method according to claim 1 wherein said catalyst is ammonia.

6. A method according to claim 1 wherein said polyvalent cationic precipitant is employed in a concentration of at least 0.5%, by weight, based on the weight of phenol employed.

* * * * *